United States Patent
Oetiker

(10) Patent No.: US 7,093,326 B2
(45) Date of Patent: Aug. 22, 2006

(54) TUBE CLAMP

(75) Inventor: Hans Oetiker, deceased, late of Horgen (CH); by Ulrich Meier, legal representative, Wädenswil (CH)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 11 days.

(21) Appl. No.: 10/469,912

(22) PCT Filed: Mar. 22, 2002

(86) PCT No.: PCT/EP02/03259

§ 371 (c)(1),
(2), (4) Date: Nov. 29, 2004

(87) PCT Pub. No.: WO02/077509

PCT Pub. Date: Oct. 3, 2002

(65) Prior Publication Data

US 2005/0223526 A1   Oct. 13, 2005

(30) Foreign Application Priority Data

Mar. 26, 2001 (EP) .................................. 01107515

(51) Int. Cl.
*B65D 63/02* (2006.01)
(52) U.S. Cl. .................... 24/20; 24/20 CW; 24/19
(58) Field of Classification Search .......... 24/427, 24/20 CW, 20 TT, 20, 19, 20 R; F16L 33/02
See application file for complete search history.

(56) References Cited

U.S. PATENT DOCUMENTS

| 3,981,053 A | * | 9/1976 | Kreuzer ................. 24/274 R |
| 4,315,348 A | | 2/1982 | Oetiker |
| 4,711,001 A | | 12/1987 | Oetiker |
| 4,742,600 A | | 5/1988 | Calmettes et al. |
| RE33,934 E | | 5/1992 | Oetiker |
| 5,177,836 A | * | 1/1993 | Kemmerich ............... 24/20 R |
| 5,251,360 A | * | 10/1993 | Putz ........................ 24/20 R |
| 5,305,499 A | * | 4/1994 | Oetiker ..................... 24/20 R |
| 6,173,626 B1 | * | 1/2001 | Rowe ....................... 74/551.9 |
| 2002/0104197 A1 | * | 8/2002 | Craig, Jr. .................. 24/20 R |

FOREIGN PATENT DOCUMENTS

| EP | 0570742 A1 | 5/1992 |
| EP | 0591648 A1 | 11/1993 |
| FR | 2594901 | 2/1986 |

* cited by examiner

*Primary Examiner*—Robert J. Sandy
*Assistant Examiner*—Marcus Menezes
(74) *Attorney, Agent, or Firm*—Barnes & Thornburg LLP

(57) ABSTRACT

For obtaining a hose clamp which has a continuously smooth inner surface free of gaps and which requires an as short as possible length of band material, the inner band end portion is provided with a tongue the length of which is approximately half the amount by which the hose clamp is narrowed during tightening. During the first half of the tightening movement, the tongue is guided transversely to the band longitudinal direction by a projection which engages a slot provided in the outer band portion. The slot at its end is continued by a window which starts at a step, and the tongue, during the second half of the tightening movement, passes through the window which then takes over the guidance of the tongue.

10 Claims, 2 Drawing Sheets

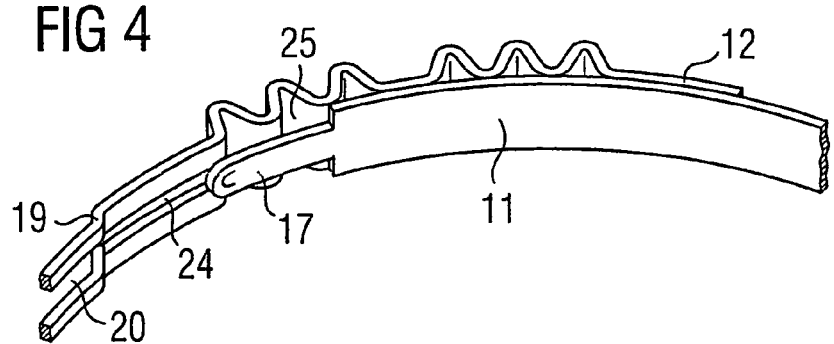
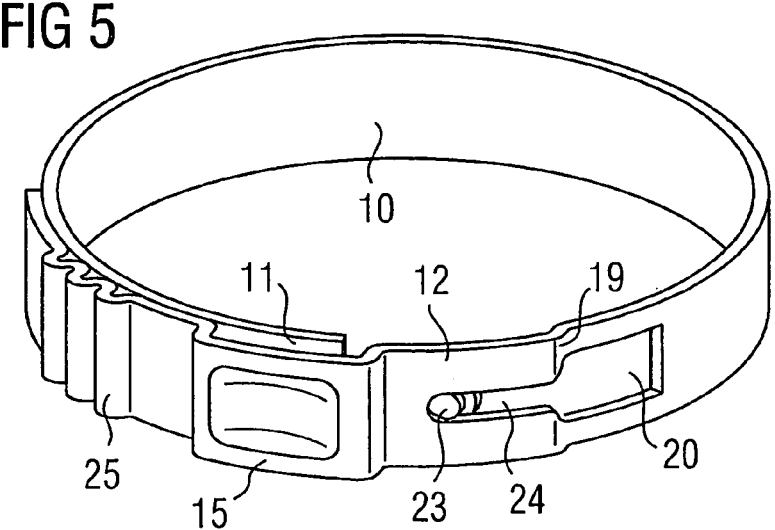
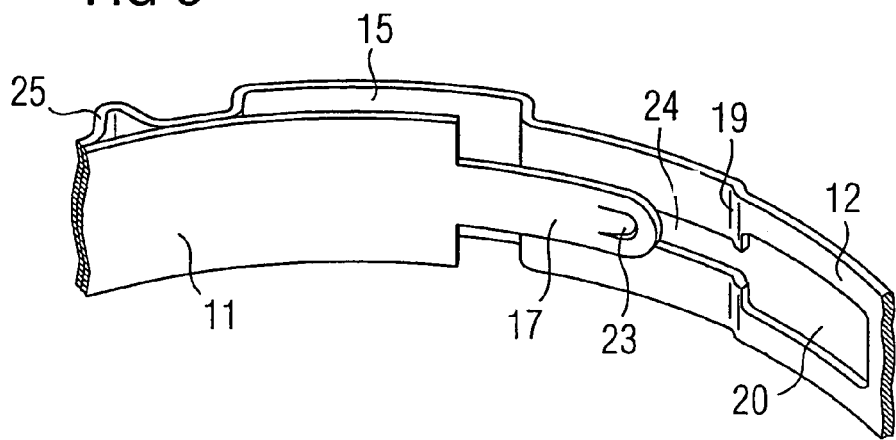

TUBE CLAMP

This application is the national stage of PCT Application PCT/EP02/03259 filed Mar. 22, 2002, which claims benefit of EP Patent Application 01107515.7 filed Mar. 26, 20001.

BACKGROUND OF THE INVENTION

U.S. Pat. No. 4,299,012 discloses a hose clamp which consists of an open band with overlapping band ends and which is adapted to be transferred from a closed condition in which the outer band end is connected to the inner band portion, to a tightened condition having a reduced inner dimension, comprising a tongue formed at the inner band end, an aperture provided in the outer band portion for receiving the tongue in the tightened condition, and a step which projects inwardly as seen from the outer band end, which extends transversely to the band longitudinal direction within the area of the end of the aperture nearer to the outer band end, and which has a height corresponding to the thickness of the band material. This hose clamp has proved suitable for fixing even thin, hard hoses to pipe nipples due to the fact that, in the tightened condition, the inner surface of the clamp is free of gaps and steps and therefore supports the hose at all circumferential positions.

For tightening the known hose clamp, a so-called "Oetiker ear" provided in the outer band section is narrowed by means of a pair of grippers. A tongue provided at the inner band end serves to bridge the gap remaining underneath the ear, the tongue cooperating with a tongue channel provided in the outer band portion. The channel is formed by two parallel cuts extending in the longitudinal direction of the band, wherein the two band portions outside these cuts are offset inwardly at their ends close to the outer band end, and the central portion situated between the cuts is offset inwardly at its end remote from the outer band end, each offset corresponding to the thickness of the band material.

In the closed but not yet tightened condition of the hose clamp, hooks provided at the inner band end are inserted in openings near the outer band end. The tongue and the tongue channel are so arranged and dimensioned in the circumferential direction of the hose clamp in such a way that, in this closed condition, the free end of the tongue just reaches the channel and the portion of full band width adjacent the tongue bridges the spacing between the legs of the ear.

In tightening, the tongue moves completely into the tongue channel until its end comes to lie close to the offset of the centre band portion between the two cuts, and the portion of full band width adjacent the tongue comes to lie close to the offset at the other end of the tongue channel. In this tightened condition, while gaps occur near the offsets, these gaps at no location extend across the full band width so that the hose is supported even in these regions by at least part of the band width, and tightness between the hose and the nipple is ensured over the entire circumference.

In the hose clamp known from EP 0 570 742 A1, the tongue during tightening enters a space between two beads formed in the inner surface of the outer band section, which beads project inwardly by an amount corresponding to the thickness of the band material and terminate in a step of the same height. In order to make sure that the tongue is laterally guided throughout the tightening process, the tongue and beads have such a length in the circumferential direction of the hose clamp that the tongue reaches the space between the beads already in the closed condition of the hose clamp.

U.S. Pat. No. 4,315,348 describes a hose clamp having a separate insert portion bridging the ear, with two tongue-type ends extending through windows provided in the outer band section.

The invention is based on the object to remove at least in part such disadvantages as occur with comparable hose clamps of the prior art. A more specific object may be seen in providing a hose clamp which requires an as small as possible length of band material at a given clamp diameter.

The solution of this object in accordance with the invention which consists of an open band with overlapping band ends and which is adapted to be transferred from a closed condition in which the outer band end is connected to the inner band portion, to a tightened condition having a reduced inner dimension, comprising a tongue formed at the inner band end, an aperture provided in the outer band portion for receiving the tongue in the tightened condition, and a step which projects inwardly as seen from the outer band end, which extends transversely to the band longitudinal direction within the area of the end of the aperture nearer to the outer band end, and which has a height corresponding to the thickness of the band material, that the length of the tongue is substantially shorter than the difference between the inner dimension of the hose clamp in its closed condition and that of the hose clamp in its tightened condition, and that the outer band portion in the region between its outer band end and the aperture has means for laterally guiding the tongue prior to its entry into the aperture. The tongue provided at the inner band end is guided during tightening of the hose clamp consecutively by two different measures wherein, during the first part of the tightening movement, the tongue is remote from the aperture and only in the second portion enters the aperture and is guided by it. The tongue can thus be shorter by roughly one half than in the prior art, which results in a corresponding saving in band material length.

The embodiment wherein the aperture is a window for the tongue to pass in the tightened condition of the hose clamp leads to a specifically safe guiding and retaining of the central band section transverse to the band.

An easily obtained possibility of guiding the tongue in the first part of the tightening movement is obtainable wherein the guiding means includes beads formed in the outer band portion on both sides of the tongue clamp of claim 3 and wherein the inner band end portion has two beads in the area adjacent the tongue in the band longitudinal direction, which beads are engaged, in the tightened condition of the hose clamp, by the two beads in the outer band portion and wherein the width of each bead is ¼ to ¹⁄₁₀ of the band width.

For reducing the friction which occurs between the tongue and the outer band portion during tightening of the hose clamp a point-shaped embossment facing the outer band portion is provided near the free end of the tongue.

A specifically safe guidance of the tongue transverse to the band longitudinal direction in the first part of the tightening movement is provided when the guiding means includes a slot continuous with the aperture in the outer band portion and a projection on the outer side of the tongue for engaging the slot and wherein the projection is a nose punched out of the tongue.

The invention is adapted for use with hose clamps with and without ear-like tightening means wherein an ear-type tightening means is provided between the guiding means and the outer band end and wherein an undulation is provided between the guiding means and the outer band end.

Advantageous embodiments will now be explained in more detail with reference to the drawings. In the drawings,

BRIEF DESCRIPTION OF THE DRAWINGS

FIG. 4 is a somewhat enlarged partial view of the hose clamp according to FIG. 3, viewed from the inside;

FIG. 5 represents a hose clamp having an Oetiker ear according to a third embodiment of the invention in the closed, not yet tightened condition; and FIG. 6 is an enlarged partial view of the hose clamp according to FIG. 5, viewed from the inside.

DETAILED DESCRIPTION OF THE DRAWINGS

Figure 1:
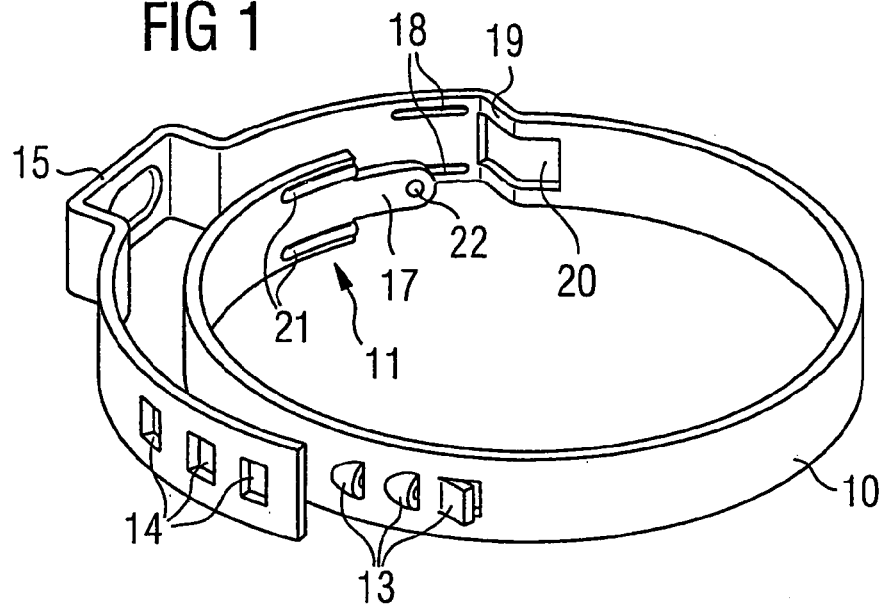
FIG. 1 shows a hose clamp according to a first embodiment in the open condition.
Figure 2:
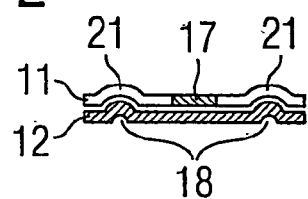
FIG. 2 is a somewhat enlarged cross-section through the tongue and the outer band portion of the hose clamp according to FIG. 1 in the tightened condition.

The open hose clamp shown in FIGS. 1 and 2 is manufactured from a steel band 10 having a width of, e.g., 10 mm and a thickness of, e.g., 1 mm and is pre-bent to the configuration shown, with mutually overlapping band ends. In this condition, the inner band end portion 11 is opposite an outer band portion referenced 12.

In order to seal, e.g. a hose (not shown) with respect to a nipple (not shown), the hose clamp is applied to the hose portion to be sealed. Upon engagement of a hook 13, provided at the inner band portion into openings 14 located near the outer band end, an overall approximately U-shaped "Oetiker ear" 15 provided in the inner band portion 12 is compressed by means of grippers so that the hose clamp is narrowed and tightened around the hose.

A tongue 17 is integrally formed at the inner band end portion 11, the tongue having a width of, e.g., 4 mm at the assumed band width of 10 mm. The length of the tongue is somewhat greater than half the amount by which the ear 15 is narrowed and the circumference of the hose clamp is reduced during tightening.

Two lateral beads 18 extending in the longitudinal direction of the band and projecting radially inwardly are formed in the opposite outer band portion 12. The beads 18 are located hear the outer band edges, each having a width of approximately ⅒ to at most ¼ of the band width. The length of the beads 18 in the longitudinal direction of the band is essentially the same as the length of the tongue 17.

The beads 18 terminate at a step 19 which projects inwardly as seen from the outer band end, extends transversely to the band longitudinal direction and has a height corresponding to the thickness of the band material.

At the start of step 19, thus at the end of the beads 18 remote from the outer band end, an overall rectangular window 20 starts, which has a width slightly larger than the width of the tongue 17 and a length that extends beyond the step 19.

Two inwardly projecting beads 21 are formed in the inner band end portion 11 on both sides of the tongue 17 and starting at the end of the tongue, the beads 18 having a length corresponding at least to the length of the beads 18. Further, the free end of the tongue 17 is provided with an outwardly projecting point-shaped embossment 22.

In the closed, not yet tightened condition, in which the hooks 13 provided on the inner band portion engage the openings 14 provided in the outer band portion 12, the free end of the tongue 17 is just between the beads 18 provided in the outer band portion. When the ear 15 is then narrowed for tightening the hose clamp, the tongue 17 at first moves between the beads 18 and is guided by them, thereby preventing the inner band end from moving relative to the outer band portion 12 transversely to the band longitudinal direction. During this movement, the embossment 22 reduces the friction between the tongue 17 and the outer band portion 12.

In the second half of this tightening movement, the tongue 17 reaches the window 20 and passes therethrough while the beads 18 provided in the outer band portion 12 engage the beads 21 formed in the inner band end portion 11. In the completely tightened condition, in which the ear 15 is closed down to a small gap, the shoulders which exist at the inner band end portion 11 on both sides of the tongue 17 are at the step 19 with a small gap remaining at these two lateral positions. Since the height of the step 19 corresponds to the thickness of the hose clamp material and since the tongue 17 at this location extends further and finally through the window 20, the result in the tightened condition is an inner surface of the hose clamp which is continuously smooth and free of gaps.

The alternative embodiments of the hose clamp shown in FIGS. 3 to 6 differ from that of FIG. 1 in that the tongue 17 in the first half of the tightening movement is guided not by lateral beads provided in the outer band portion but by an outward projection 23 formed at the free end of the tongue, which projection 23 engages a narrower slot 24 continuous with the window 20. The projection may be formed as a nose or, alternatively, as a rearwardly bent hook. A hook has the advantage that it may engage at the closed end of the slot 24, thereby rendering an inadvertent opening of the hose clamp difficult.

Figure 3:
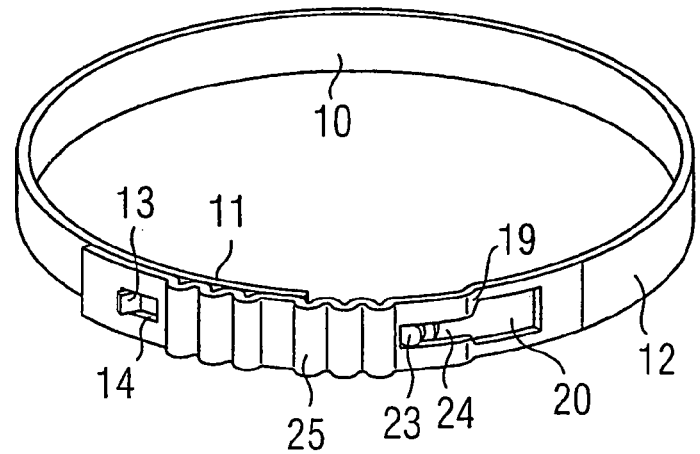
FIG. 3 shows an earless hose clamp according to a second embodiment in the closed, not yet tightened condition.

The hose clamp of FIGS. 3 and 4 is an earless hose clamp, wherein the resiliency required for sealing a hose to a nipple is achieved by an undulation 25.

On the other hand, the hose clamp of FIGS. 5 and 6 is a hose clamp which, just as that of FIG. 1, has an Oetiker ear 15, with an undulation 25 being provided as an additional elasticity reserve.

The invention claimed is:

1. A hose clamp made of an open band having an inner band portion with an inner band end, an outer band portion with an outer band end overlapping said inner band portion, the clamp being adapted to be transferred from a closed condition having an inner dimension in which said outer band end is connected to said inner band portion, to a tightened condition in which the clamp has a reduced inner dimension, the clamp comprising a tongue formed at said inner band end, the tongue having a length which is substantially smaller than the difference between the inner dimension of the clamp in said closed condition and the reduced inner dimension of the clamp in said tightened condition, an aperture provided in said outer band portion for receiving said tongue in said tightened condition, a step projecting inwardly, as seen from said outer band end, extending transversely to the band longitudinal direction within an area of an end of the aperture nearer to said outer band end, and having a height corresponding to the thickness of the band material, and guide means provided in said outer band portion between said outer band end and said aperture for laterally guiding said tongue prior to its entry into said aperture.

2. The clamp of claim 1 wherein said aperture is a window for said tongue to pass in said tightened condition.

3. The clamp of claim 1 wherein said guide means includes beads formed in said outer band portion on both sides of said tongue.

4. The clamp of claim 3 wherein said inner band portion has two beads in an area adjacent said tongue in the band longitudinal direction, which beads are engaged, in said tightened condition, by said two beads formed in said outer band portion.

5. The clamp of claim 3 wherein the width of each bead is ¼ to ⅒ of the band width.

6. The clamp of claim 1, comprising a point-shaped embossment provided near the free end of said tongue, said embossment facing said outer band portion.

7. The clamp of claim 1 wherein said guide means includes a slot continuous with said aperture in said outer band portion and a projection formed on an outer side of said tongue for engaging said slot.

8. The clamp of claim 7 wherein said projection is a nose punched out of said tongue.

9. The clamp of claim 1 comprising ear-type tightening means provided between said guide means and said outer band end.

10. The clamp of claim 1 comprising an undulation provided between said guide means and said outer band end.

* * * * *